Dec. 4, 1923.
H. A. CRESS, JR
1,476,239
CAMPING VEHICLE
Filed Nov. 17, 1921
3 Sheets-Sheet 1
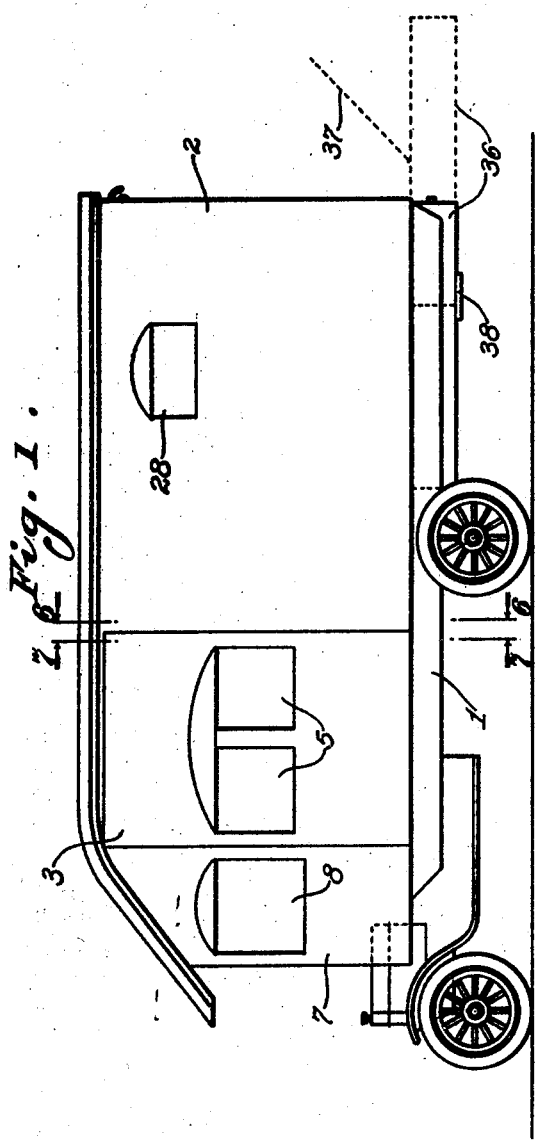
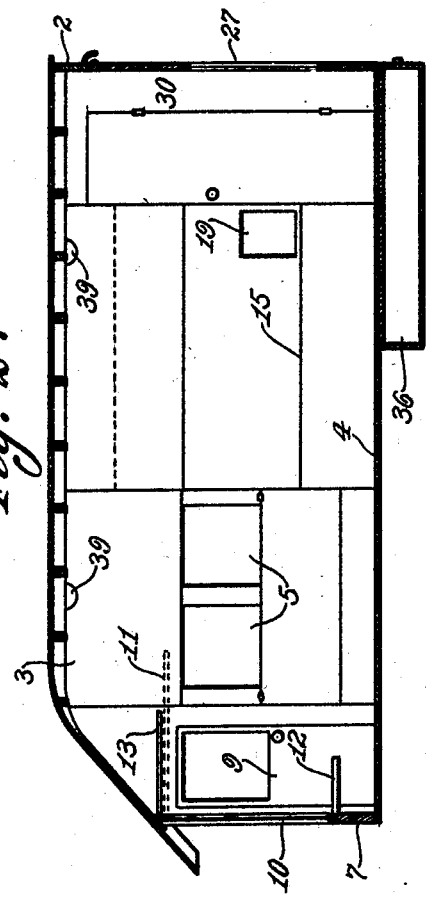
Inventor:
HENRY A. CRESS, JR.,
By John H. Bruninga
His Attorney.

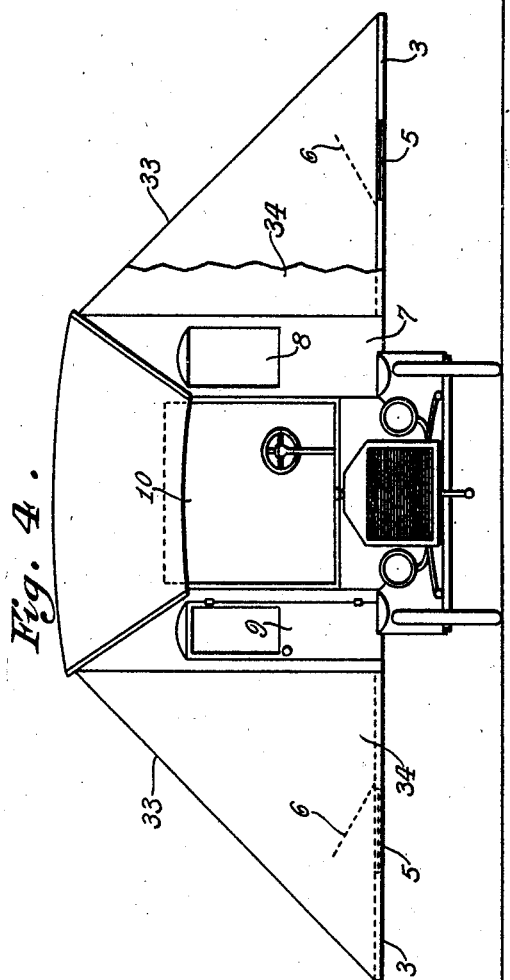
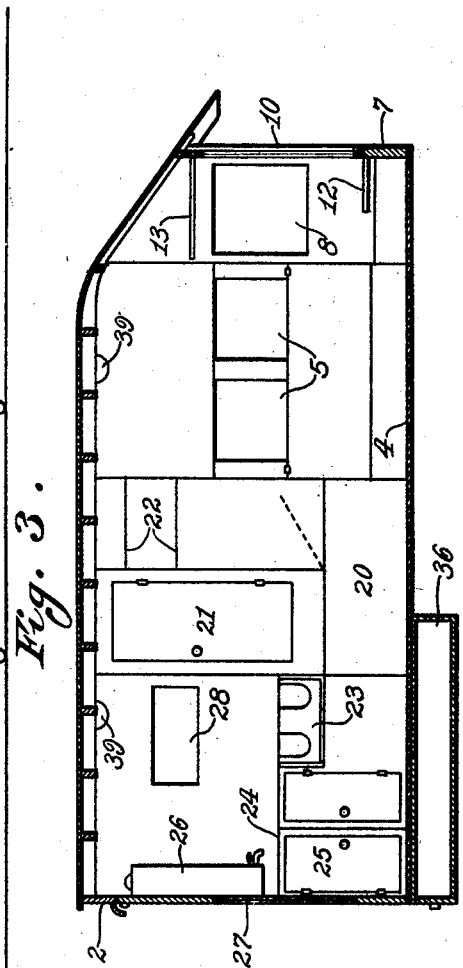

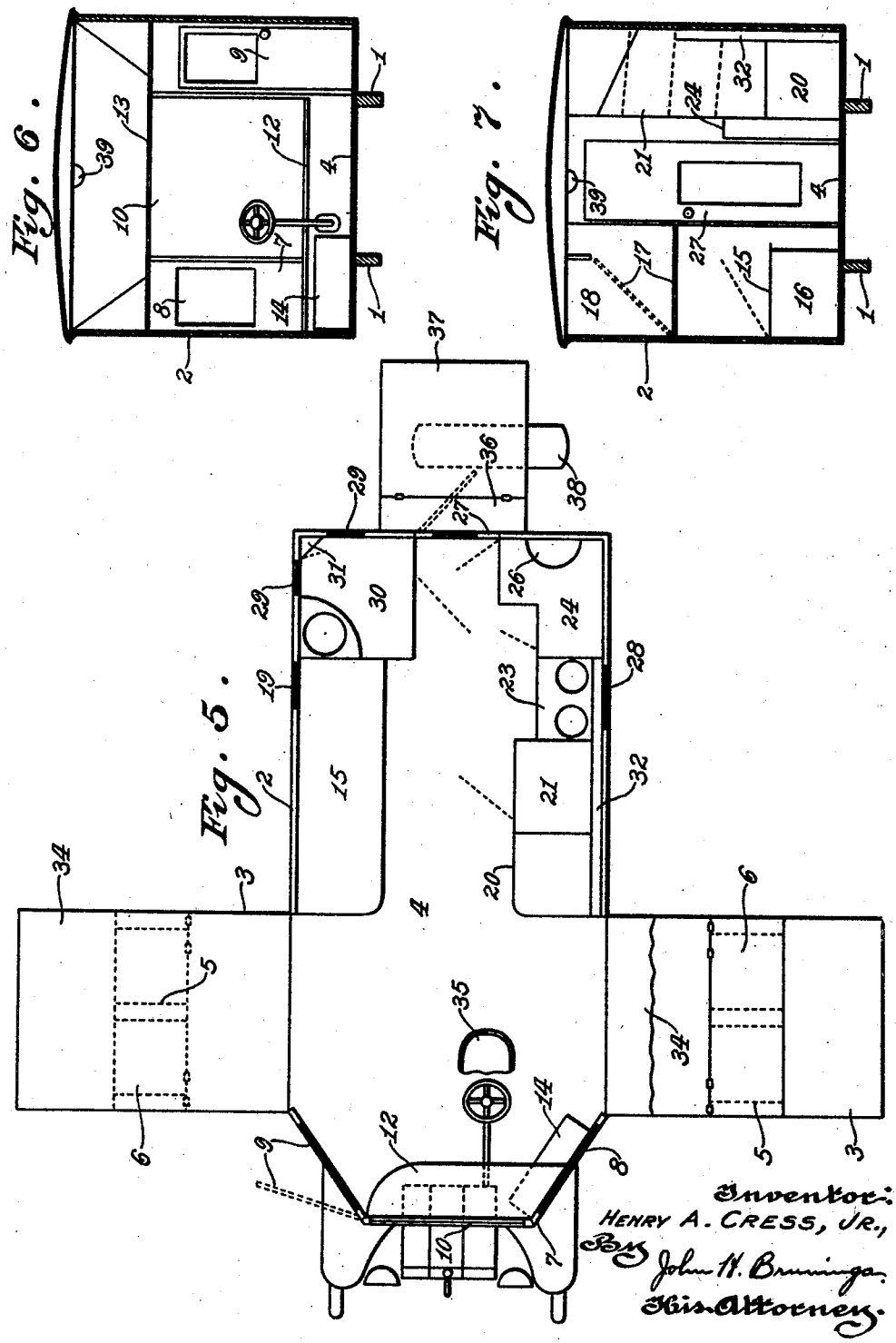

Patented Dec. 4, 1923.

1,476,239

UNITED STATES PATENT OFFICE.

HENRY A. CRESS, JR., OF HILLSBORO, ILLINOIS.

CAMPING VEHICLE.

Application filed November 17, 1921. Serial No. 515,775.

*To all whom it may concern:*

Be it known that I, HENRY A. CRESS, JR., a citizen of the United States, and residing at Hillsboro, county of Montgomery, State of Illinois, have invented the new and useful Improvement in Camping Vehicles, of which the following is a specification.

This invention relates to camping vehicles and more particularly to automobiles fitted up for camping trips or for traveling purposes.

One of the objects of this invention is to provide a vehicle which may be used for camping or traveling purposes and which shall be fitted up with various home conveniences and shall be adapted to be used as sleeping quarters providing ample space for sleeping at night and for comfortable traveling or residence purposes by day.

Another object of this invention is to provide such a vehicle in which all parts are arranged in the most compact form so that the vehicle may provide a comfortable and uncramped temporary dwelling.

Further objects will appear from the detail description taken in connection with the accompanying drawings in which:

Figure 1 is a side elevation of an automobile embodying this invention;

Figure 2 is a central longitudinal sectional view, showing the right hand side of the interior of the car;

Figure 3 is a view similar to Figure 2, showing the left hand side of the car;

Figure 4 is a front view in elevation showing the car with the sides let down;

Figure 5 is a floor plan of the car with the sides let down;

Figure 6 is a section on line 6—6, Figure 1; and

Figure 7 is a section on line 7—7, Figure 1.

Referring to the accompanying drawings, 1 designates the frame work which is preferably constructed of light tough wood, such as poplar, and is arranged to be attached to the chassis of an automobile by means of bolts. This frame may be arranged, for instance, to be attached to the well known Ford truck chassis by means of six bolts, so that the body may be applied or removed from the chassis at will so that the truck may be used for other purposes when not in use for camping purposes. The body 2 of the car is built upon the frame 1 by any well known method of construction. A desirable form of construction is to make the body of wall board or similar material with an outside covering of a light gage of sheet iron which may then be covered with a good coat of protective paint. At the fore end of the body a section 3 thereof on each side may be constructed of wainscoting or similar material adapted to form a floor section. These sections 3 are hinged at the lower edge thereof to the body, so that they may be let down as shown in Figure 4, to a horizontal position level with the floor 4 of the main body of the car, the floor 4 being built in any usual manner upon the frame 1. The sections 3 are provided with windows 5 to admit light to the interior of the body while traveling and to allow passengers a view of the outside. The sections 3 are further provided with smaller sections 6 also contructed of wainscoting and hinged at their lower edges to the sections 3 on the interior thereof. These sections 6 hang down on the inside of the wall sections 3 while traveling and are adapted to be placed over the windows 5 when the sections 3 are let down so as to provide a continuous floor surface for those sections. The sections 3 being on the level with the main floor 4, a comparatively great area of floor surface, all at the same level, is provided.

The forward end of the body is provided with a housing or cab 7 which, however, is not partitioned off from the rest of the body. This cab extends forwardly over the hood of the automobile to provide accommodation for the driver in traveling. The cab is provided with a window 8 on the left hand side and a glazed door 9 on the right hand side. The door 9 is provided for access to the cab by the driver. The cab 7 is further provided with a window 10 in front to allow the driver an unobstructed view of the road. This window may be raised when desired to a horizontal position 11 shown in dotted lines in Figure 2. A seat 12 may be provided along the front of the cab and a shelf 13 may be arranged in the upper part thereof to provide storage space. The seat 12 is for use chiefly when the car is stationary. The gasoline tank may be conveniently located as shown at 14 in Figure 5.

The rearward part of the car is provided with various arrangements for the comfort and convenience of the occupants. On the right hand side of the car a couch 15 is provided which has a hinged lid, the under part being constructed in the form of a box to provide storage space 16. Above the couch 15 a folding berth 17 is hinged to the wall and arranged to be let down in a horizontal position or to be raised to the position indicated in dotted lines in Figure 7. The space 18 above this berth, when folded up, may be used for the storage of bed clothing and similar articles. A window 19 may be provided above the couch 15. In the rear corner on the right hand side a toilet and dressing room 30 may be provided having windows 29 and, if desired, a medicine chest 31.

The left hand side of the car is provided with an ice box 20 and in the space above the ice box a locker 21 and shelves 22 may be provided for storage. Beside the locker 21 and the ice box 20 space is provided for a small oil stove 23. In the rearward corner a table 24 is provided having a locker 25 therebeneath. This table may be used for culinary and similar operations and the locker 25 may be provided for the storage of utensils. A water tank 26 is conveniently mounted on the rear wall over the table 24. A window 28 may be provided in a convenient place over the stove 23 and the table 24. A rear door 27 is provided in the rear wall of the car. The rear door 27 is provided with a glass panel extending down to near the lower edge thereof so as to provide the driver with a view of the road behind him. The windows 5, 8, 10, 19, 28 and 29 and the doors 9 and 27 may be provided with sliding glass as is the usual construction with automobile windows and are also preferably provided with removable screens.

A space 32 is allowed between the wall and the ice box 20 and locker 21 for the storage of one or more spring mattresses which may be placed upon the extended sections 3 when let down for sleeping at night. These sections when let down are supported by cables 33 suitably attached to the upper part of the body and a covering 34 of canvas or similar material may be provided to cover the extended sections, being supported by the cables 33.

A sliding drawer 36 suitably supported on rails in any usual and well known manner is arranged upon the frame work 1 and underneath the floor of the body. This drawer is arranged to slide out rearwardly to extend beyond the rear of the car and is equipped with a hinged lid 37. This drawer may be utilized for the storage of spare tires, automobile tools and similar articles. The drawer is of stout construction so that when run out to extended position as illustrated in Figure 5, it may be used as a platform or porch. A sliding step 38 is arranged to be extended on either side of the drawer 36 so as to provide easy access to the porch and the rear door 27.

A series of electric lights 39 may be arranged at desirable points and may be fed by the storage battery of the car.

While traveling the sections 3 of the sides are, of course, raised so as to completely enclose the car body. The sections 6 may then be let down so as to leave the windows 5 unobstructed or, if preferred, these sections may be supported suitably in a horizontal position as to form shelves. When thus closed up the body affords a comfortable traveling compartment. A seat 35 may be provided for the driver and other passengers may be comfortably accommodated upon the couch 15 or upon loose chairs which may be located at will upon the floor 4. The driver is permitted an unobstructed view of the road through the windows 8 and 10 and the door 9 and also rearwardly through the rear door 27. When a halt is made for the night all conveniences for perparation of meals, etc. are immediately at hand. Sleeping accommodations are afforded by lowering the side sections 3 and arranging beds thereupon, comfortable spring mattresses being carried as described in the compartment 32. The couch 15 and the berth 17 are also adapted to accommodate sleepers. It will be evident, therefore, that a fairly large party can be comfortably accommodated both by day and by night in a car built according to this invention.

It is obvious that various changes may be made in details of construction without departing from the spirit of this invention; it is, therefore, to be understood that this invention is not to be limited to the specific details shown and described.

Having thus described the invention, what is claimed is:

1. In an automobile for camping purposes, a closed body having a side thereof provided with a window and mounted to be let down to form a floor, and a floor section mounted on said side and movable over said window to complete the floor.

2. In an automobile for camping purposes, a closed body having a room floor, a doorway to the room, and a floor section mounted underneath said body floor for extension rearwardly beyond said body to provide an entrance platform leading to said doorway.

3. In an automobile for camping purposes, a closed body having a room floor, a doorway to the room, and a storage tray mounted for extension rearwardly beyond said body to provide an entrance platform leading to said doorway.

4. In an automobile for camping purposes, a closed body having a floor, a floor section mounted for extension beyond said body to provide a platform, and a step extensible on said section.

5. In an automobile for camping purposes, a closed body having a main floor and having a side section provided with a window and mounted to be let down to form an outer floor extension level with said main floor, means for supporting said side section when let down, and a floor section mounted on said side and movable over said window to complete the floor.

In testimony whereof I affix my signature this 8th day of October, 1921.

HENRY A. CRESS, Jr.